(12) United States Patent
Mueller-Fischer

(10) Patent No.: US 8,502,818 B1
(45) Date of Patent: Aug. 6, 2013

(54) SYSTEM AND METHOD FOR SURFACE TRACKING

(75) Inventor: Matthias Mueller-Fischer, Zurich (CH)

(73) Assignee: NVIDIA Corporation, Santa Clara, CA (US)

( * ) Notice: Subject to any disclaimer, the term of this patent is extended or adjusted under 35 U.S.C. 154(b) by 526 days.

(21) Appl. No.: 12/834,301

(22) Filed: Jul. 12, 2010

(51) Int. Cl.
*G06T 17/00* (2006.01)

(52) U.S. Cl.
USPC .......................................................... 345/420

(58) Field of Classification Search
USPC ................................................. 345/419–428
See application file for complete search history.

(56) References Cited

U.S. PATENT DOCUMENTS

| | | | |
|---|---|---|---|
| 6,982,710 B2 * | 1/2006 | Salomie .......................... | 345/420 |
| 8,264,487 B2 * | 9/2012 | Cohen ............................ | 345/424 |

OTHER PUBLICATIONS

Wojtan et al., Fast Viscoelastic Behavior with Thin Features, ACM Transactions on Graphics, vol. 27, No. 3, Article 47, Aug. 2008.*
Muller, Fast and Robust Tracking of Fluid Surfaces, Eurographics/ACM SIGGRAPH Symposium on Computer Animation, Aug. 2009, pp. 237-246.*
Glimm J., Grove J. W., Li X. L.: Three dimensional front tracking. SIAM Journal on Scientific Computing 19 (1998), 703-727.
Glimm J., Grove J. W., Li X. L., Tan D. C.: Robust computational algorithms for dynamic interface tracking in three dimensions. SIAM Journal on Scientific Computing 21 (1999), 2240.
Hogea C., Birosa G., Abraham F., Davatzikos C.: A robust framework for soft tissue simulations with application to modeling brain tumor mass effect in 3d mr images. Phys. Med. Biol. 52 (2007), 6893-6908.
Kenney J., Hwang G.: Electrochemical machining with ultrashort voltage pulses: modelling of charging dynamics and feature profile evolution. Nanotechnology 16,7 (2007), 309-313.
Kim B., Liu Y., Llamas I., Jiao X., Rossignac J.: Simulation of bubbles in foam with the volume control method. ACM Trans. Graph. 26,3 (2007), 98pp.
Lorensen W., Cline H.: Marching cubes: A high resolution 3d surface construction algorithm. In Proceedings of ACM SIGGRAPH 87 (1987), pp. 163-169.
Leung S., Zhao H.: A grid based particle method for moving interface problems. Journal of Computational Physics 228 (8) (2009), 2993-3024.
Miled M. B. H., Miller E. L.: A projection-based level-set approach to enhance conductivity anomaly reconstruction in electrical resistance tomography. Inverse Problems 23,6 (2007), 2375-2400.
Brochu T., Bridson R.: Fluid animation with explicit surface meshes. In Symposium on Computer Animation 2006, poster session (2006).

(Continued)

*Primary Examiner* — Xiao M. Wu
*Assistant Examiner* — Charles Tseng
(74) *Attorney, Agent, or Firm* — Zilka-Kotab, PC

(57) ABSTRACT

A method for tracking a surface representation includes providing an initial mesh representing a surface, the initial mesh comprising a plurality of mesh faces. A grid is constructed, the grid having a plurality of grid edges, whereby each grid edge is connected between two grid nodes, and each grid node has a predefined value associated therewith. The grid overlaps the initial mesh, such that at least one mesh face intersects at least one grid edge. A new value for a grid node connected to the intersected grid edge is computed based upon its intersection by the mesh face, and the initial mesh is modified based upon the new value of the grid node to produce a modified mesh, the modified mesh providing an updated representation of the surface.

23 Claims, 8 Drawing Sheets

OTHER PUBLICATIONS

Bargteil A. W., Goktekin T. G., O'Brien J. F., Strain J. A.: A semi-lagrangian contouring method for fluid simulation. ACM Transactions on Graphics 25, 1 (2006).
Cheng L. T., Dzubiella J., McCammon J., Li B.: Application of the level-set method to the implicit solvation of nonpolar molecules. Journal of Chemical Physics 127,8 (2007).
Crane K., Llamas L., Tariq S.: Real-time simulation and rendering of 3d fluids. GPU Gems 3 (2007), 633-673.
Desbrun M., Cani M.: Active implicit surface for animation. In In proceedings of Graphics Interface 1998 (1998).
Enright D., Fedkiw R., Ferziger J., Mitchell I.: A hybrid particle level set method for improved interface capturing. In J. Comput. Phys (2002), pp. 83-116.
Enright D., Losasso F., Fedkiw R.: A fast and accurate semi-lagrangian particle level set method. In Computers and Structures (2005), pp. 479-490.
Foster N., Fedkiw R.: Practical animation of liquids. In In proceedings of Siggraph 2001 (2001), pp. 23-30.
Houston B., Bond C., Wiebe M.: A unified approach for modeling complex occlusions in fluid simulations. In SIGGRAPH '03: ACM SIGGRAPH 2003 Sketches & Applications (2003), ACM.
Losasso F., Gibou F., Fedkiw R.: Simulating water and smoke with an octree data structure. In Proceedings of SIGGRAPH 2004, ACM TOG 23 (2004), pp. 457-462.
Osher S., Sethian J. A.: Fronts propagating with curvature dependent speed: Algorithms based on hamilton—jacobi formulations. J. Comput. Phys. 79 (1988), 12-49.
Stam J.: Stable fluids. In in Proceedings of ACM Siggraph 99 (1999), pp. 121-128.
Teschner M., Heidelberger B., Müller M., Pomeranerts D., Gross M.: Optimized spatial hashing for collision detection of deformable objects. In in Proceedings of Vision, Modeling, Visualization VMV 2003 (2003), pp. 19-21.
Wojtan C., Thürey N., Gross M., Turk G.: Deforming meshes that split and merge. ACM SIGGRAPH 2009 Papers 28 (3) (Aug. 2009).
Adams, B. et al., "Adaptively Sampled Particle Fluids," In Proceedings of ACM SIGGRAPH '08, 2008, pp. 1-7.
Enright, D. et al., "Animation and Rendering of Complex Water Surfaces," In Proceedings of the 29th Annual Conference on Computer Graphics and Interactive Techniques, ACM Press, pp. 736-744.
Gingold, R. A. et al., "Smoothed particle hydrodynamics: theory and application to non-spherical stars," Monthly Notices of the Royal Astronomical Society, 1977, vol. 181, pp. 375-389.
Meisters, G. H., "Polygons Have Ears," The American Mathematical Monthly, Jun.-Jul. 1975, vol. 82, No. 6, pp. 648-651.
Muller, M. et al., "Particle-Based Fluid Simulation for Interactive Applications," In Proceedings of ACM SIGGRAPH Symposium on Computer Animation, 2003, pp. 154-159.
Osher, S. et al., "Level Set Methods and Dynamic Implicit Surfaces," Springer 2003, vol. 153, pp. 1-273.
Sethian, J., "Level Set Methods and Fast Marching Methods: Evolving Interfaces in Computational Geometry, Fluid Mechanics, Computer Vision, and Materials Science," Cambridge University Press, 1996, ISBN 0521645573, pp. 1-378.

* cited by examiner

SYSTEM AND METHOD FOR SURFACE TRACKING

BACKGROUND

The present invention relates to the construction of surface representations, and more particularly, to systems and methods for tracking surface representations.

The tracking of surface representations, or "surface tracking" as known in the art, can generally be described as the rendering or illustration as to the movement or progression of a surface over time, and is an important process in many fields, such computer graphics in simulation of fluid surfaces, surface rendering of soft tissue deformation in medical simulation, computed tomography, molecular dynamics, and feature profile evolution in nanotechnology. The surfaces of rigid and deformable objects which are to be monitored are often represented by explicit triangle meshes. Triangle meshes are simple and efficient data structures. They can be sent directly to GPUs for rendering for instance. In addition, the explicit representation makes direct Lagrangian simulation of cloth or soft bodies straight forward. One simply modifies the vertex positions. Under large deformations, local re-sampling might be necessary as well. Meshes are well suited as long as the topology of the surface does not change. In the case of deformable solids this is guaranteed in most scenarios (except when the bodies are allowed to merge or tear).

For solids, the self collision handling process should make sure that surfaces do not self-intersect. In contrast, the free surface of a liquid constantly changes its topology by splitting and merging with itself. In this scenario, working with explicit representations of the surface becomes more problematic. A triangle mesh would need to be repaired whenever a self intersection occurs.

Previous approaches to address this problem include the "Level Set Method" described by J. Sethian in "Level Set Methods and Fast Marching Methods," Addison-Weslay Publishing Company, ISBN 0521645573, 1999, incorporated herein by reference. In summary, the method defines the surface implicitly as the zero set of a scalar field—typically its signed distance field. During simulation, the scalar field is advected along a velocity field. In case of a fluid simulation, the velocity field is given as the solution of the Navier-Stokes equations. A typical algorithm to simulate free surface fluids in an Eulerian, grid-based setting includes the following steps of:

1) Updating the velocity field by solving the Navier Stokes equations on the fluid grid;
2) Solve the advection equation on the level set;
3) Update the structure of the narrow band grid and extrapolate the level set values;
4) Re-normalize the level set; and
5) Extract a triangle mesh from the level set for rendering using Marching Cubes.

Unfortunately, high resolution simulations of this type are still too expensive to run in real time. Particularly, the resolution of the level set is higher than the one of the fluid grid, and steps 2-4 become the bottleneck in both performance and memory consumption.

Accordingly, what is needed is an improved system and method for surface tracking which is more efficient in terms of memory and computational resources consumed.

SUMMARY

The present invention provides an improved system and method for surface tracking addressing one or more of the aforementioned deficiencies. The method includes an operation of providing an initial mesh representing a surface, the initial mesh including a plurality of mesh faces. The method further includes an operation of constructing a grid having a plurality grid edges, whereby each grid edge is connected between two grid nodes, and each grid node has a predefined value associated therewith. The grid overlaps the initial mesh such that at least one mesh face of the initial mesh intersects at least one grid edge. A new value for a grid node connected to the intersected grid edge is computed based upon the grid edge's intersection by the mesh face, and the initial mesh is modified based upon the new value of the grid node to produce a modified mesh, the modified mesh providing an updated representation of the surface.

These and other features of the invention will be better understood in view of the following drawings and detailed description of exemplary embodiments.

For clarity, previously numbered features retain their reference indices in subsequent drawings.

DETAILED DESCRIPTION OF EXEMPLARY EMBODIMENTS

Figure 1:
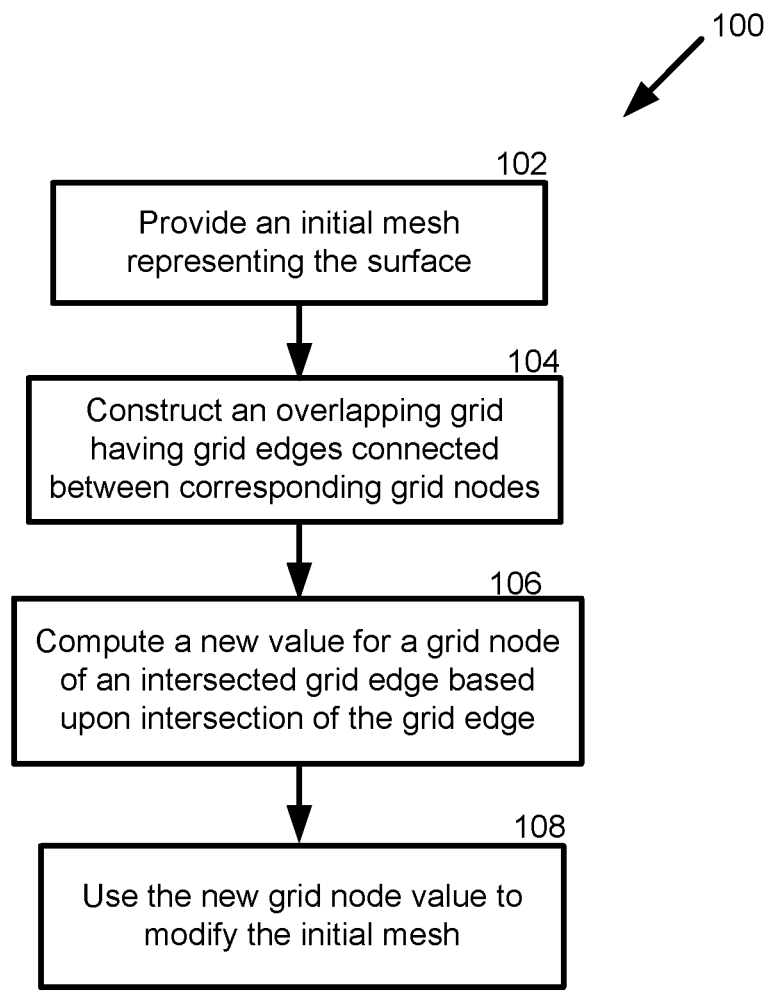
FIG. 1 illustrates an exemplary method for tracking a surface representation in accordance with one embodiment of the present invention.

FIG. 1 illustrates an exemplary method for tracking a surface representation in accordance with the present invention. At 102, an initial mesh representing a surface is provided, the initial mesh including a plurality of mesh faces connected between vertices. At 104, a grid is constructed which includes a plurality of grid edges, each grid edge connected between two grid nodes, each grid node having a predefined value associated therewith. Further, the grid is constructed to overlap the initial mesh, such that at least one grid edge is intersected by at least one mesh face of the mesh. At 106, a new value is computed for a node connected to the intersected grid edge based upon that grid edge's intersection by the mesh face. At 108, the initial mesh is modified based upon the new value of the grid node to produce a modified mesh, the modified mesh providing an updated representation of the surface. The updated representation may be rendered, typically sequentially in time after the initial mesh, thus permitting a time-lapsed display of the surface as it undergoes a change in its appearance.

Exemplary of operation 102, the initial mesh ("initial surface mesh" or "input mesh," as referred to herein) may be a default/starting surface mesh, or it may be a modified surface mesh which has been produced from a previous iteration of operations 102-108 herein. Further exemplary, the input mesh is a 3-dimensional structure composed of polygons as mesh faces, e.g., an explicit triangle mesh. In such an embodiment, the mesh faces are 2-dimensional structures, e.g., triangles, although other geometric primitives may be used as well. The number of polygons/triangles included within the mesh is chosen based upon the performance criteria of the rendering system (e.g., speed, resolution, level of detail, etc.), and the number of triangles may range from tens, hundreds, thousands, millions, or more. In an exemplary embodiment, the number of polygons used to form a 3-dimensional polygon mesh ranges from hundreds to tens of thousands.

In one exemplary embodiment, the initial mesh represents a fluid surface, and the following embodiments are presented in accordance with this exemplary embodiment. In other embodiments, the initial mesh represents a non-fluid surface, as the invention is equally applicable to the tracking of any surface type, fluid or otherwise.

Further exemplary, the input mesh may be repeatedly modified, e.g., through multiple iterations of operations 102-108 in which a modified mesh produced in a previous iteration is used as an initial mesh in a subsequent iteration. Such repeated processing may be used, for example, to simulate relative motion of the surface. In such embodiments, the surface will be characterized by a velocity field, along with the vertices of the mesh will be advected. In such an embodiment, the coordinates of the vertices of the mesh will be as described by a solution to the Navier-Stokes equations, as known in the art. The initial mesh is used as an input ("input mesh") in the present method, and the modified mesh is produced as an output ("output surface mesh" or "output mesh" as referred to herein), the modified mesh being subsequently assigned as an input mesh in a particular embodiment of the invention in which multiple iterations of the method 100 are carried out.

Exemplary of operation 104, a 3-dimensional grid (exemplary, a regular 3-D Eulerian grid) is constructed which at least partially overlaps, and in a particular embodiment, envelops the initial mesh over the x, y and z dimensions of the initial mesh. The grid is composed a plurality of cells, the planar surface of each cell having four grid edges connected between four grid nodes. The grid overlaps the initial mesh such that at least one grid edge is intersected by at least one mesh face of the initial mesh. Each grid edge is of arbitrary length, and in an exemplary embodiment a cell includes grid edges of equal lengths, although cells of non-equal grid edge lengths may be used in alternative embodiments. The 3-dimensional grid may include any number of cells, for example, several, tens, hundreds, thousands, millions, or more cells, and in a specific embodiment, a grid size of 100×100×100 cells is constructed. In a particular embodiment, a sparse data structure based on spatial hashing is used to store only the cells of the grid which are intersected by the initial mesh. The spatial hashing technique is disclosed in Teschner et al. in "Optimized Spatial Hashing for Collision Detection of Deformable Objects," Proceedings of Vision, Modeling, Visualization VMV 2003 (2003), pp. 19-21, herein incorporated by reference.

Further exemplary of operation 104, each node is assigned a predefined value, for example, an initialized value of 0. The "grid node value" (i.e., the value associated with a particular node) will be modified depending upon whether a mesh face intersects a grid edge to which the node connects, as will be further described below.

Exemplary of operation 106, a new value for the grid node, i.e., a value different from the predefined value, is computed if the node is connected to an intersected grid edge. Further exemplary, the new value is computed as a function of the number of mesh faces which intersects the grid edge, and/or the "orientation" of such intersecting mesh faces. In a specific embodiment, each mesh face has internal and external sides denoting internal and external regions of the medium (e.g., a fluid) which forms the surface, respectively, and the "orientation" of an intersecting mesh face refers to which of these sides is adjacent to the grid node itself. Exemplary, the external side of each mesh face includes a normal vector extending orthogonally therefrom. As such, the external side (and by the vector's absence, the internal side) of each mesh face is identifiable.

In a specific embodiment of operation 106, the value associated with the subject node is computed as a first value if the internal side of the intersecting mesh face is adjacent to the grid node, or as a second value if the external side of the intersecting mesh face is adjacent to the grid node. The first and second values correspond to classification of the grid node as being an interior or exterior node, and thus the initial mesh can be accordingly modified to include or exclude the node, as further described below.

The grid node for which a new value is computed is one of the grid nodes connected (contiguously) to the intersected grid edge. In the above-described embodiment, a node's orientation to one side of the intersecting face (e.g., the externally-facing side) results in the computation of a new value.

Exemplary of operation 108, the grid node is identified based upon its new value as an interior node located either inside, or an exterior node located outside of the fluid surface. The initial mesh is accordingly modified to include (i.e., enclose) the grid node if it is identified as located within the surface (an internal grid node), or to exclude the grid node if it is identified as located outside the surface (an external grid node). A resulting modified mesh (the "output mesh") is produced which includes or excludes the grid node, according to the node's characterization. In a particular embodiment, marching square templates are used to produce the modified mesh, as will be further described below. The use of marching cube templates for modifying a surface mesh is described by W. Loresen et. al. in "Marching Cubes: A High Resolution 3d Surface Construction Algorithm," Proceedings of ACM SIGGRAPH 87 (1987), pp. 163-169, herein incorporated by reference.

In one embodiment, operations 106 and 108 are performed on a node-by-node basis, whereby a new value is computed for a particular grid node, and a modified mesh is produced based upon the new grid node value for each node in the constructed grid. In another embodiment, operations 106 and 108 are "batch processes," i.e., each operation is carried out for a plurality of grid nodes, wherein new values are computed for two or more grid nodes in operation 106, and a modified mesh is produced at 108 based upon the plurality of new values for the two or more nodes.

While the foregoing exemplary embodiment describes the initial mesh, the grid and the modified mesh as 3-dimensional structures, the present invention may be used to track 2-dimensional surfaces as well, with the aforementioned features applied to 2-dimensional mesh and grid structures. For example, the initial mesh supplied at operation 102 may be a 2-dimensional structure, in which case the mesh faces forming this initial mesh would be 1-dimensional mesh segments. Consistent with this embodiment, operation 104 would involve constructing a 2-dimensional grid which at least partial overlaps with, and in a specific embodiment, envelops (i.e. completely encompasses over 2-dimensions) the initial mesh structure. Operation 106 would involve computing a different value for a node connected to an intersected grid edge based upon the intersecting mesh segment (e.g., orientation and/or number of the intersecting mesh segments). Operation 108 would involve modifying the initial mesh based upon the computed new value of the grid node, the modified mesh providing an updated representation of the surface.

Figure 2A:
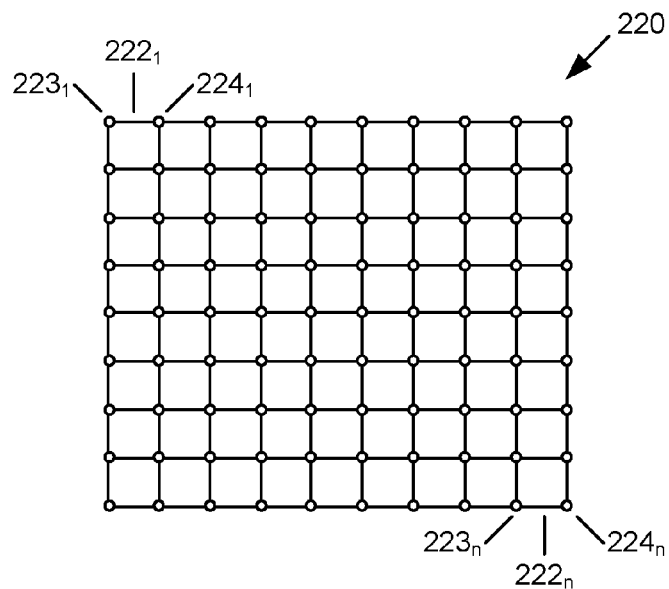
FIG. 2A illustrates a grid implemented in accordance with the method of FIG. 1.

FIG. 2A illustrates a view of a grid constructed in accordance with the method of FIG. 1. The grid 220 includes n grid edges $222_1$-$222_n$, each grid edge $222_i$ connected between a corresponding two grid nodes $223_i$ and $224_i$. A grid cell is formed as a quadrilateral structure having four grid edges and four grid nodes. The grid is formed in a two-dimensional plane, where the x-plane represents the horizontal axis of the drawing, the y-plane represents the vertical axis of the drawing and the z-plane of the grid extends normally into the plane of the drawing. Each grid node $223_i$ and $224_i$ is associated with a value, exemplary a predefined value of zero, once the grid 220 is initially constructed. In an alternative embodiment in which a 2-dimensional surface is tracked, the constructed grid 220 is completely described in two planes and no additional planes are included.

Figure 2B:
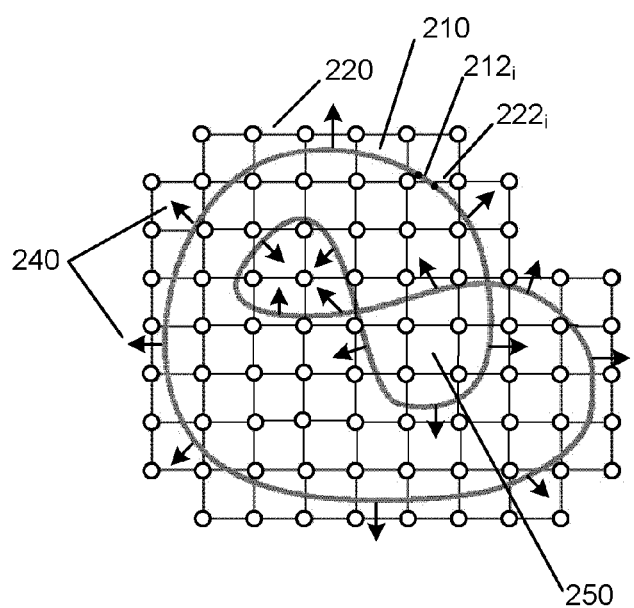
FIG. 2B illustrates an initial mesh representing a fluid surface in accordance with the method of FIG. 1.

FIG. 2B illustrates a view of an initial mesh enveloped within a grid in accordance with the method of FIG. 1, with previously identified features retaining their reference indices. The x, y and z planes of the structure are as described in FIG. 2A. The mesh faces are illustrated as line segments, the line segments representing one side of a polygon used as a mesh face for the initial mesh 210.

The initial mesh 210, representing in an exemplary embodiment, a fluid surface, is enveloped within the grid 220, and the initial mesh 210 is composed of a plurality of mesh faces 212, at least one of which $212_i$ intersects at least one grid edge $222_i$, as shown. The number of mesh faces 212 making up the initial mesh 210 may be any arbitrary number, and range from several, tens, hundreds, thousands, millions, or more. The initial mesh 210 is further characterized as including normal vectors 240 which extend from the externally-facing side of its mesh faces 212, as shown. The normal vectors 240 are directed toward the medium that is outside of the surface (exemplary, a fluid surface), thus identifying the inside area of the fluid surface for the particular plane shown (x-y plane as illustrated). From this arrangement, it can be seen that the fluid surface 210 includes a portion/area 250 in which the fluid surface overlaps or intersects itself in the x-y plane shown. It will be appreciated that two additional planar views (in the x-z view plane and the y-z view plane) of the surface mesh/grid structure will additionally exist, and will include features of the initial mesh 210, its corresponding mesh faces 212, and normal vectors extending therefrom 240, as well as corresponding planar faces of the grid 240. The self-intersecting portion 250 of the fluid surface may or may not be shown in one or more of those additional planar views, depending upon this feature's visibility therein.

In an alternative embodiment of FIG. 2B in which the surface representation is of a 2-dimensional surface, the input surface mesh 210 is a line segment mesh, and the line segments 212 are 1-dimensional, each of which includes normal vectors 240 identifying the externally-facing side of the 2-dimensional surface. Each of the illustrated features are completely contained in two dimensions, including the self-intersecting portion 250.

Figure 3:
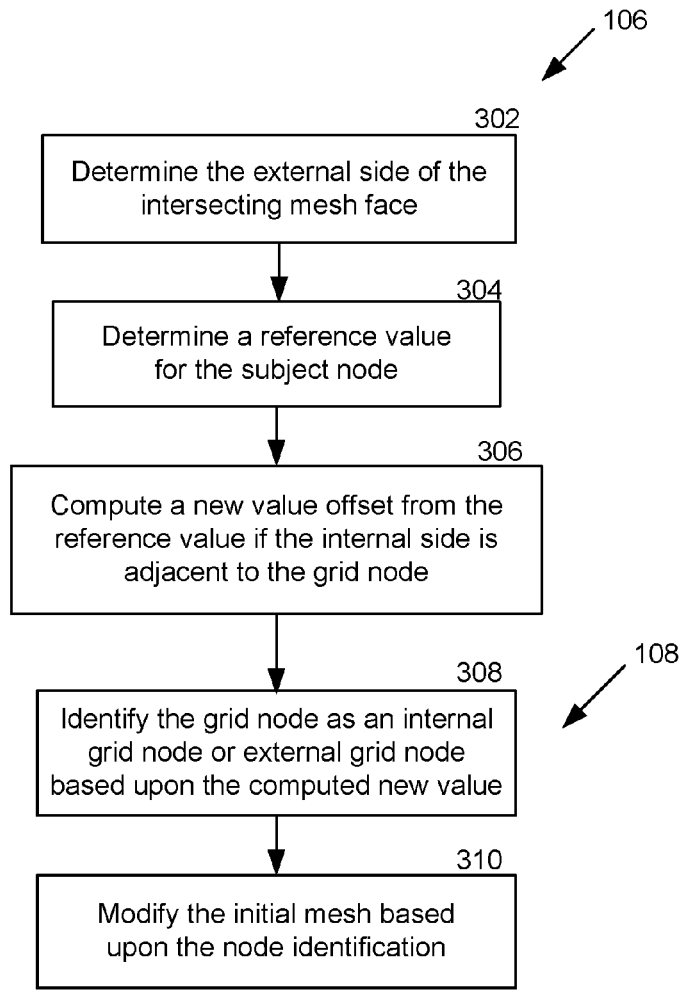
FIG. 3 illustrates an exemplary detailed implementation of the method of FIG. 1.

FIG. 3 illustrates detailed embodiments of operations 106 and 108 in accordance with FIG. 1 and the present invention. Operations 302-306 collectively represent a detailed implementation of operation 106, and operations 308 and 310 collectively represent a detailed implementation of operation 108.

At 302, the external side of the intersecting mesh face is determined. For example, the side of the mesh face from which the normal vector extends is determined. If two or more intersecting mesh faces are identified, the external side of each is determined.

At 304, a "reference value" associated with the grid node is determined. Exemplary, the "reference value" is a predetermined value associated with another one of the grid nodes, the other node referred to herein as a "reference node" for the particular grid node whose new value is being computed (referred to as the "subject node" for clarity). The predetermined value may be an initialized/default value, or it may be a grid node value which was previously computed according to operations 302-306 for the reference node. The reference node may be a node which is proximate to the subject node, for example, most proximate to the subject node in any direction in any of the grid's x, y, or z dimensions. For example, a node to the most immediate left or right of the subject node (i.e., along the negative or positive directions along the x-dimension of the grid) may be selected as the reference node. Alternatively, the reference node may be one or more nodes removed from the subject node in any direction or dimension (e.g., the y, or z dimension in the illustrated embodiment).

In one embodiment, the reference value is an initialized value assigned to the grid node, e.g., a value of 0. In another embodiment, the reference value will be a value computed for a previously-processed grid node according to operations 302-306. In still a further embodiment, the reference value is computed as a function of two or more grid node values, for example a weighted or un-weighted average of the two or more grid node values. For example, the reference value for a subject node may be selected as the average of previously-computed grid node values of nodes located most proximately to the subject node.

At 306, the new value is computed as an offset from the reference value if the internal side of the intersecting mesh face is adjacent to the subject node. The internal side of the mesh face is determined to be "adjacent to the subject node" if it is more proximate to the subject node than the external side. In other words, the side (internal or external) from which a line can be drawn to the subject node without passing through the other side is the side which is adjacent to the subject node. In an exemplary embodiment, a predefined count value (e.g., 1) is added to the reference and the sum assigned to the subject node if the internal side of the intersecting mesh segment is adjacent to the subject node.

Optionally, a second new value is computed for the subject node if the external side of the intersecting mesh is adjacent to the subject grid. Exemplary of this embodiment, a predefined count value (e.g., 1) is subtracted from the reference value. Further exemplary of this embodiment, a minimum value (e.g., 0) is maintained for the grid node value regardless of the result obtained, and thus the subtraction operation is conditional.

At 308, the grid node is identified, based upon the node's newly computed value, as either an internal grid node located inside of the surface (exemplary, a fluid surface) area, or an external grid node located outside of the surface area. At 310, the boundary of the initial mesh is modified to include the grid node if it is identified as an internal nodes inside the surface area, or to exclude the grid node it is identified as an external grid node. Further particularly, marching square templates are used to construct a modified mesh, as will be further described below.

Figure 4A:
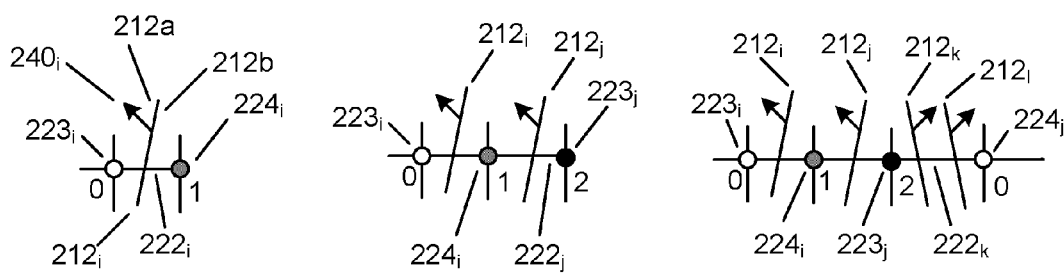
FIG. 4A illustrates an exemplary embodiment of computing a new value for a grid node in accordance with the method of FIG. 1.

FIG. 4A illustrates an exemplary embodiment of computing a new value for a grid node in accordance with the method of FIG. 1 and operations 302-308 of FIG. 3. Each mesh face 212 represents either a 1-dimensional line segment for a 2-dimensional surface tracking embodiment, or one side of intersecting polygon for a 3-dimensional surface tracking embodiment. Three different examples are shown, arranged left to right. The first example shown on the left illustrates one segment $212_i$ intersecting a grid edge $222_i$ between nodes $223_i$ and $224_i$. The external side $212a$ of mesh face $212_i$ is identified with a normal vector extending therefrom, with the mesh face's internal side $212b$ located oppositely therefrom. The value associated with the first grid node $223_i$ is exemplary 0, this value serving as the reference value for second grid node $224_i$. The internal side $212b$ of the mesh face $212_i$ is adjacent the second grid node $224_i$, and in accordance with exemplary operations 106 and 302-306, the value associated with second node $224_i$ is computed as the reference value (first node $224_i$ having an associated value of 0) increased by a predetermined amount (e.g., 1), for a computed value of 1 for the second grid node $224_i$ (node shown shaded in gray). The first node $223_i$ is identified as an exterior node (having a minimum value of 0), and the second node $224_i$ is identified as an interior node (having a value which is higher than the reference value of 0), The second example in the middle of the figure illustrates another embodiment in which the foregoing operations are repeated. In this example, a second mesh face $212_j$ is shown intersecting a second grid edge $222_j$ which is located between the second grid node $224_i$ and a third node $223_j$. Exemplary, the reference value for the third node $223_j$ is the previously-computed value for the most proximate node, in this case second node $224_i$, having a value of 1. The second mesh face $212_j$ is oriented such that its internal side (opposite the external side having the normal vector extending therefrom) is adjacent to the third node $223_j$, and accordingly, the value associated with the third node $223_j$ is computed as the reference value, increased by a predetermined value (count value of 1) for a value of 2 (node shown shaded in black).

The third example on the right side of the figure illustrates a third embodiment in which the foregoing operations are repeated. In this example, third and fourth mesh faces $212_k$ and $212_l$ are shown intersecting a third grid edge $222_k$ which is located between the third grid node $223_j$ and a fourth node $224_j$. Exemplary, the reference value for the fourth node $224_j$ is the previously-computed value for the most proximate node, in this case third node $223_j$, having a value of 2. Both of the third and fourth mesh faces $212_k$ and $212_l$ are oriented such that their external sides are adjacent to the fourth node $224_j$, and accordingly, the value associated the fourth node $224_j$ is computed as the reference value decreased by two instances of the predetermined value (or two count values), for a value of zero as shown. In a particular embodiment, intersecting mesh faces which are located closer than a predefined distance ϵ away from each other along a grid edge are considered one intersecting mesh face.

Further to the illustrated embodiment, the illustrated operations are carried out according to operations 302-306 moving along a positive direction in the x-plane, left to right. In another embodiment, operations 302-306 may be repeated in the opposite (or "negative") x-plane direction moving right to left in order to identify the same node as either interior or exterior nodes in order to provide improved node classification accuracy. Further exemplary, operations 302-306 may be repeated along different axes, e.g., in one or both of the y and z-planes in either (both) of the positive or (and) negative directions therefor for a 3 dimensional surface tracking embodiment in order to provide additional accuracy as to the node's classification as an interior or exterior node.

It will be understood that in the illustrated embodiment, the initialized value assigned to each of the grid nodes in operation 104 represents a value identifying each node as an external node, and the computation operation 106 (particularly operations 302-306) is performed to change this value toward a new value that identifies an interior node when the requisite conditions (i.e., when an interior side of an intersecting mesh face is adjacent a node) are present. Of course, the opposite approach may be undertaken, whereby the initialized value assigned to the nodes at operation 104 represents interior nodes, and the computation operations 302-306 are performed to change those initial values toward a value identifying a node as an exterior node.

Figure 4B:
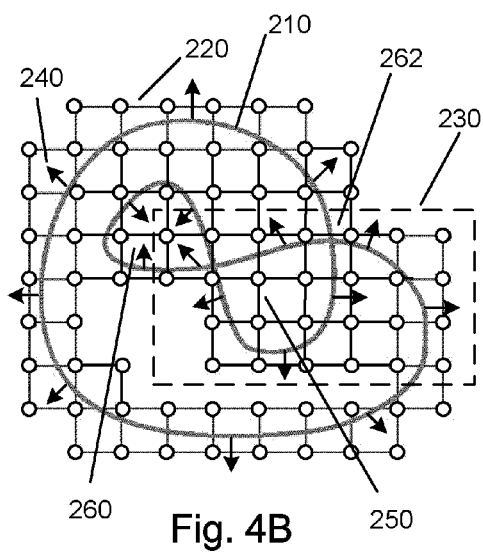
FIG. 4B illustrates an exemplary fluid surface representation provided in accordance with the method of FIG. 1.

FIG. 4B illustrates an exemplary fluid surface representation provided in accordance with the method of FIG. 1, with previously identified feature retaining the reference indices. All grid nodes are unshaded, representing that each retains an initialized value (e.g., 0, identifying each initially as an exterior node) at this stage of the process. Description of the invention in terms of tracking a fluid surface is only exemplary, as the invention can be applied to the tracking of non-fluid surfaces as well.

As shown, the grid 220 overlays the initial mesh 210, the initial mesh 210 composed of mesh faces, each of which includes a normal vector 240 (only a few instances shown so as not to obscure the drawing) that extends normally from the fluid surface boundary outwardly therefrom. The orientation of the surface may be visualized as a top view, although another orientation (e.g., as a side view) is equally valid. Region 230 (further detailed in FIG. 4C) includes an area 250 of self-intersection, whereby the fluid surface overlaps with itself, as the normal vectors extend outwardly from each other in this region. Region 260 represents a gap area in the fluid surface, as the normal vectors in this area are directed towards each other.

Figure 4C:
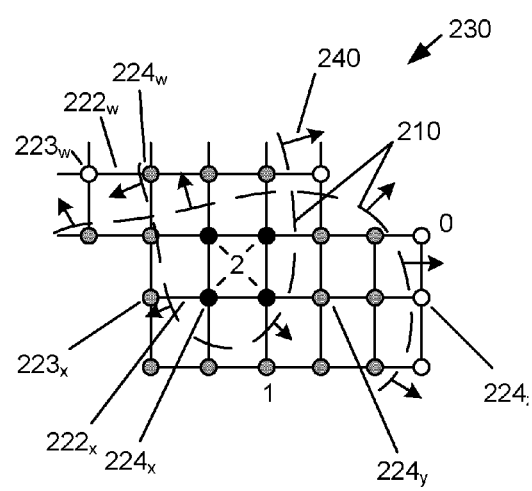
FIG. 4C illustrates an exemplary self-intersected portion of the fluid surface shown in FIG. 4B.

FIG. 4C illustrates the self-intersecting region 230 of the fluid surface shown in FIG. 4B, with previously-identified features retaining their reference indices. In this embodiment, the nodes are shaded the color representative of the nodes value, i.e., unshaded nodes have an initialized value of 0, gray nodes have a value of 1, and black nodes have a value of 2. The nodes have been processed according to operations 302-306, in which the value of the most proximate left node serves as the reference value for the subsequent right node, and the predefined value added to or subtracted from the reference value is a count value of 1, in accordance with the examples shown in FIG. 4A. The initial mesh 210 is shown as a dashed line, the dashed portions representing the mesh faces forming the initial mesh 210. Normal vectors 240 are shown extending from some of the mesh faces.

Referring to the unshaded node 223, in the left upper corner of the figure, this node represents a node in the gap region 260 of the fluid surface of FIG. 4B. The next node $224_w$ has an associated value of 1, as the internal side of the mesh face intersecting grid node $222_w$ is adjacent to subject node $224_w$, thereby resulting in an addition of one count value to the node's associated reference value of zero from the most proximate left node $223_w$.

Referring to gray shaded node $223_x$ at the bottom left of the figure, this nodes represents a node within the fluid surface to the left of the self-intersected portion thereof. The next node $224_x$ to the right has an associated value of 2, as the internal side of the mesh face intersecting gird node $222_x$ is adjacent subject node $224_x$, thereby resulting in an addition of one count value to the node's associated reference value of 1 from the most proximate left node $223_x$. Along the same row, node $224_y$ has an associated value of 1, having undergone a decrementing operation since it is oriented adjacent to the external side of a mesh face which intersects a corresponding grid edge to its left. Similarly, node $224_z$ has an associated value of 0, as it is also oriented adjacent to the external side of a mesh face intersecting a corresponding grid edge to its left.

In the foregoing manner, grid nodes can be classified as either outside the fluid surface if it has an associated value of 0 (or less if not limited to a minimum value of 0), or inside the fluid surface if it have an associated value of 1 or more. Further particularly to interior nodes having a value of 1 or more, a node within a self-intersected portion of the fluid surface will have an associated value of 2 or more. As such, nodes within a self-intersected portion of the fluid surface can be identified, and the initial mesh forming the fluid surface can be modified to render a seamless surface taking into consideration the self-intersected portion thereof.

Figure 4D:
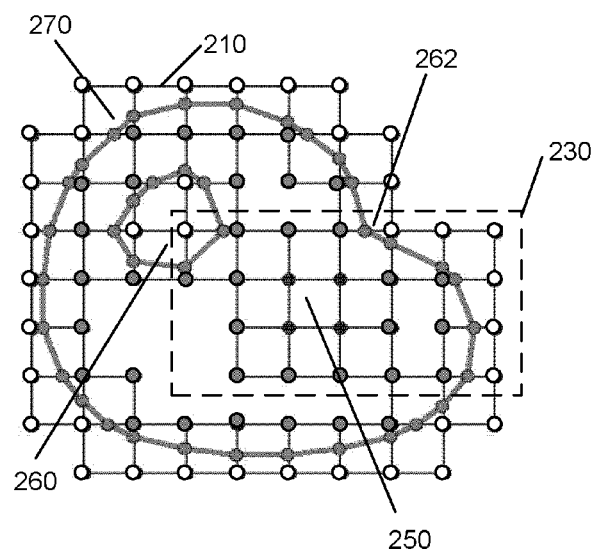
FIG. 4D illustrates a modified mesh provided in accordance with the method of FIG. 1.

FIG. 4D illustrates a modified mesh 270 produced in accordance with the method of FIG. 1, particularly with reference to operations 308 and 310, with previously-identified features retaining their reference indices. The modified mesh 270 omits the boundaries of the self-intersected portion 250 in region 230 shown in FIGS. 4B and 4C. In particular, any mesh faces extending between interior nodes (nodes having an associated value of 1 or greater in the exemplary embodiment) are omitted. Accordingly, the mesh faces formerly included in the self-intersected region 230 are omitted from the modified mesh 270.

Further exemplary, the length and/or direction of the mesh faces forming the modified mesh 270 are arranged so that they extend between an interior node and an exterior node i.e., grid nodes having associated values of 0 and 1, respectively in the illustrated exemplary embodiment. Accordingly, the gap portion 260 is "closed," i.e., the length and/or direction of one or more mesh faces are modified to connect to other mesh faces to form a closed circle around gap portion 260. Similarly, the length and/or direction of one or more mesh faces in region 262 are modified to connect to other mesh faces to form a continue boundary of the fluid surface. Modification of the length/direction of the mesh faces may be performed using any known techniques, for example interpolating between the positions of the most proximate mesh faces. In another embodiment, marching squares are used to modify the boundary of the modified mesh, as further illustrated below.

It will be further understood that the actual value of a node included within a self-intersected portion of the fluid surface can be used to permit a distinction in the rendering of a self-intersected portion of the surface versus a non-self-intersected portion, as well as between portions of the surface having differing degrees/levels of self-intersection. For example, the actual value of nodes included within a self-intersected area may be used as an input to compute the shading of a fluid surface area encompassing those nodes, whereby the color, texture, reflection, refraction, thickness, or other features are rendered as a function of the actual values assigned to those nodes. In such an embodiment, the aforementioned operations 302-306 permits the computation of a node value over a wide enough range to permit the desired degree of differential for the rendered features, e.g., operations 302-306 are operable to generate two, four, ten, one hundred, one thousand, one million, or more different node values.

Volume Conservation

The present invention exploits the use of a surface's explicit representation to provide a volume control technique for improved volume conservation of the surface, e.g, a fluid surface. The volume enclosed by the fluid surface is given by:

$$V = \frac{1}{6} \sum_{i=1}^{n_{triangles}} (p_{t_1^i} \times p_{t_2^i}) \cdot p_{t_3^i} \qquad \text{eq. (1)}$$

where $t_1^i$, $t_2^i$ and $t_3^i$ are the three indices of the vertices belonging to triangle i and $p_i$ the positions of the vertices. The volume gain $\Delta V$ when moving all vertices of the modified/output mesh by a distance d along their normal vector can be approximated as:

$$\Delta V \approx Ad, \qquad \text{eq. (2)}$$

where $$A = \frac{1}{2} \sum_{i=1}^{n_{triangles}} |p_{t_1^i} \times p_{t_2^i}| \qquad \text{eq. (3)}$$

is the area of the output mesh representing the fluid surface. Accordingly, the volume of the fluid surface may be kept at a desired volume $V_0$ by moving all vertices by the distance:

$$d=(V_0-V)/A \qquad \text{eq. (4)}$$

along their outward normal vector. In a particular embodiment, only triangles and vertices which are not in contact with a boundary are considered in Eq. (3) and Eq. (4) to ensure that the fluid surface does not extend into solid objects. Exemplary, the entire fluid surface is used to the fluid surface's volume.

The methods of tracking a surface representation as described herein can be used in combination with the volume conservation technique to provide a fast and robust simulation of free surface liquids with very limited memory consumption. Additionally, texture coordinates can be preserved simple way of preserving texture coordinates. In particular, each vertex of the new mesh is created by an intersection of a grid edge with a triangle. The texture coordinates of the new vertex is computed as the barycentric sum of the texture coordinates of the vertices adjacent to that intersecting triangle. The barycentric weights are given by the location where the edge hits the triangle. If multiple triangles intersect an edge, an arbitrary triangle is chosen.

Extended Marching Square Template Set

FIGS. 5A-5E illustrate exemplary 2- and 3-dimensional marching square templates (also referred to as "marching cube templates") employed for modifying the initial mesh in accordance with operations 108 and 310. The marching cube templates include nodes and grid edges which are to be incorporated into the initial mesh, thereby forming a modified mesh in accordance with operations 108 and 310. Application of the marching square templates to form the modified mesh permits the preservation of subgrid features without the need for local subdivision of the grid itself. Consequently, incorrect renderings, such as the sudden disappearance of thin layers (due to the layer's size decreases below the grid spacing level), can be avoided with the present invention. In a particular embodiment, the type of subgrid geometry a cell can hold is restricted to one arbitrarily thin layer in order to bound the complexity and the number of vertices created at each time step.

Further particularly, a mesh face is extracted from one of a plurality of marching square templates and incorporated into the initial mesh to produce a modified mesh, as will be further described below.

As shown, the marching cubes include the previously-identified exterior and interior nodes identified as unshaded and black (B), as well as three additional node types: green (G), red (R) and yellow (Y). Exemplary, the green (G) node is formed along a grid edge between an interior and exterior node. Each edge connecting nodes of the same classification/type can also contain an interval of the opposite type bounded by two additional nodes, identified as red (R) nodes. Further exemplary, cells may also include an interior node identified as a yellow (Y) node. Application of the marching cubes in operations 108 and 310 results in the modified mesh incorporating the grid edges as shown in the marching cubes templates of FIGS. 5A-5E. Grid edges are formed between the grid nodes as shown. For clarity, the indicia G, R and Y are located adjacent to the nodes identified thereby. Placement of the indicia between two nodes indicates that both nodes are of the identified color.

Figure 5A:
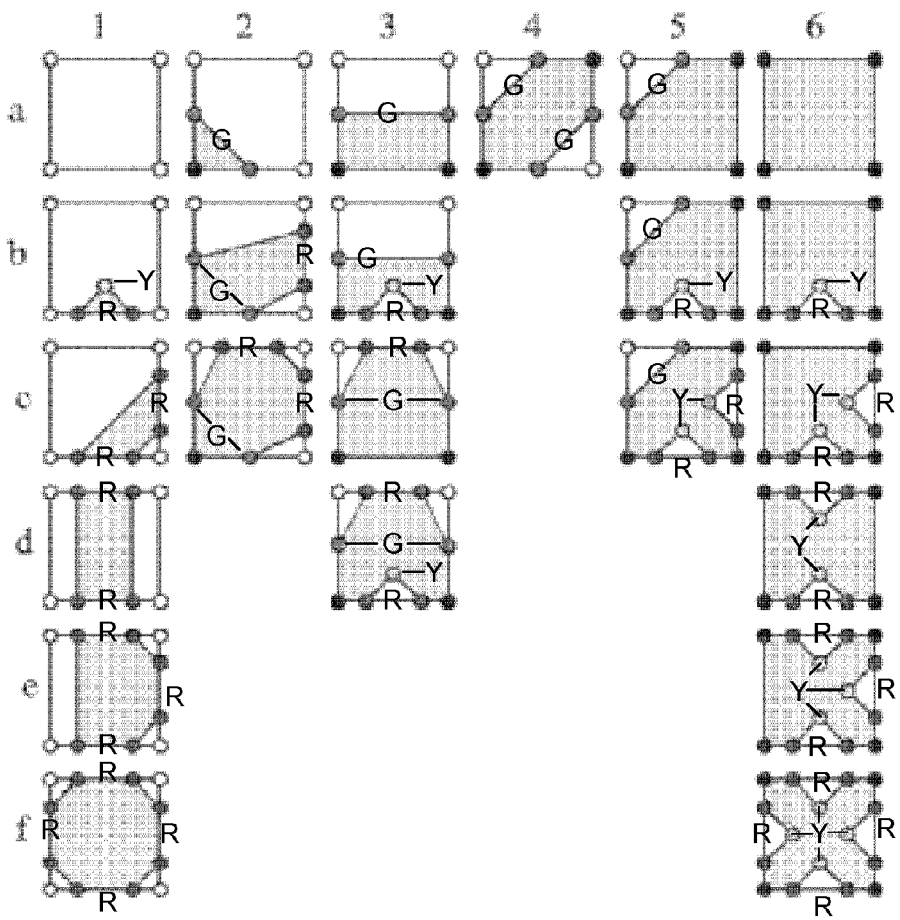
FIGS. 5A-5E illustrate exemplary marching square templates employed in accordance with the methods of FIG. 1

FIG. 5A illustrates marching squares (also referred to as "marching cubes") employed for modifying the initial mesh in accordance with operations 108 and 310. The top row (row a) illustrates the standard marching squares templates modulo rotation. On each grid edge with adjacent nodes of different type, a vertex is created (identified with a G for the color green).

It is possible that an edge is intersected by two (or any even number of) mesh faces that are oppositely oriented, resulting in the two corresponding grid nodes on either side of the intersecting segments being classified as the same type (e.g., both interior or both exterior nodes). Application of the standard marching cubes illustrated in row (a) of FIG. 5A would not retain this detail. This detail is preserved in the present invention as follows: For each grid edge with adjacent nodes of the same type for which at least two intersections are determined, two additional red (R) vertices are created. Exemplary, their positions are chosen as the minimum and maximum locations of all registered intersections on the grid edge.

Accordingly, an enlarged set of marching cube templates is provided to account for the additional vertices, as shown in rows b-f of FIG. 5A. In addition to the two states of the grid nodes (i.e., classification as either an interior or exterior node), grid edges have two states as well—they can contain zero or two red vertices. This enlarges the number of marching cube templates from a total 24 to 28. Not all of the 28 configurations are valid though because red vertices are potentially created only on grid edges with adjacent nodes of the same type. Further, the marching square templates illustrated in FIG. 5A may have a dual, whereby another solution exists as to the arrangement of the grid edges illustrated therein, given the same placement of the grid nodes.

Figure 5B:
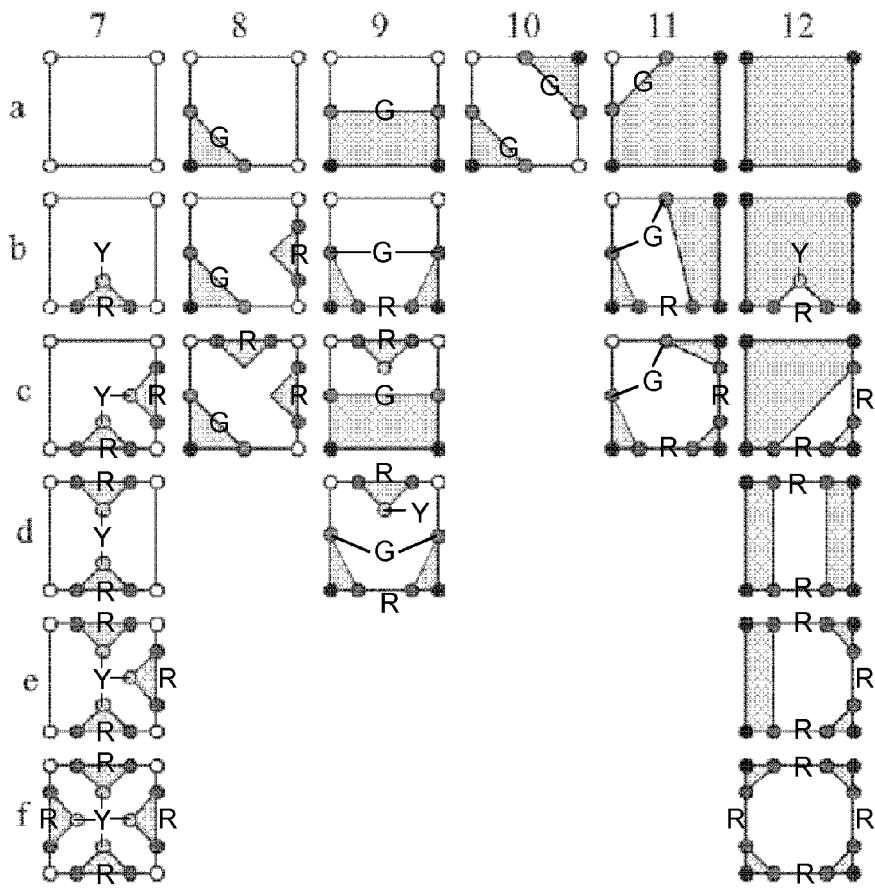

FIG. 5B illustrates exemplary dual marching square templates of the marching square templates shown in FIG. 5A. As shown, row (a) of FIG. 5B shows the dual templates corresponding to row (a) of FIG. 5A. As an example, template a-4 in FIG. 5A has a dual template a-10 shown in FIG. 5B, each having a different arrangement as to the grid edges provided for modifying the initial mesh. Additional ambiguities in the extended templates in rows (b) through (f) of FIG. 5A can be seen when comparing the possible duals of such templates in corresponding rows (b) through (f) of FIG. 5B. The ambiguity is solved in one embodiment by testing the value of the center of the cell. For example when deciding between templates a-4 and a-10, a value of a node located at the cell center is determined. If the value corresponds to an interior cell, template a-4 is chosen (shaded are indicating an interior value for the cell center), otherwise template a-10 is chosen (unshaded area indicating an exterior value for the cell center). This approach may also be employed with the extended template set b-1 through f-6 as these templates mostly extend over the cell centers, while their dual counterparts b-7 through f-12 tend to not extend over the cell centers. Exemplary, columns 1, 2, 3, 4 and 11, 12 are used independent of the state (i.e., interior or exterior) of the center. This reduces the number of yellow vertices needed, and balances out the bias of inside/outside area in the set of templates of FIG. 5A.

Figure 5C:
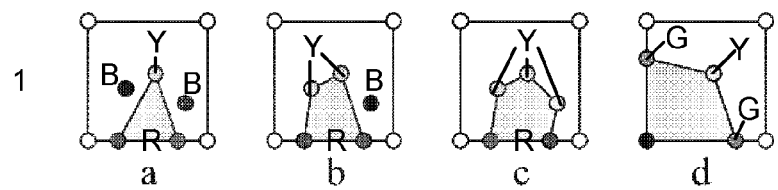

Certain cases exist where additional nodes may be necessary. Referring to cell 1-*b*, for example, a thin layer ends inside the cell, and accordingly a yellow node (Y) is used to retain the front. The case occurs if the initial mesh takes a turn inside the cell, which is possible if there is an vertex inside the cell. In this case, this vertex of the input surface is chosen directly for the construction of the new surface (the modified mesh). In some cases, more than one vertex exists within a cell of the initial mesh. In order to control the complexity of the new surface, a limit as to the number of internal vertices retained is provided (e.g., by the user). In the exemplary marching cube templates shown in FIGS. 5A and 5B, the limit (k) is two internal cell nodes. FIG. 5C shows the cases k=1 (1-*a*), k=2 (1-*b*) and k=3 (1-*c*). The vertices are chosen such that the enclosed region has maximal area. Internal vertices of the input mesh can be used in other templates as well, for example, to preserve sharp edges and conserve volume more accurately as 1-d shows.

Further exemplary, an additional level of control for deciding between retention of thin levels of detail and computing cost can be obtained by defining a predefined threshold distance between two red vertices. If the distance of the two red vertices goes below a threshold, they are discarded. Also, in the case of liquid simulation, it is feasible to ignore thin layers of void altogether by only creating red vertices if both ends of an edge are marked as outside.

The 2-dimensional marching cube templates shown in FIGS. 5A-5C may be extended to 3-dimensions, whereby triangles are created for a corresponding 3-dimensional grid cell. Exemplary, triangles are created for 3-dimensional cells using three operations. First, the 2-dimensional templates shown in FIGS. 5A-5C are used on all 6 faces of the cell independently to create the green, red and yellow vertices plus grid edges between them. In the 3-dimensional case, the yellow vertices are located where mesh faces intersect the faces of the cells. In order for the triangulation to be compatible across grid cells, the configuration on a cell face is independent of features of the cell not contained in that face. As such, each cell face can be processed independent of each other.

In a second operation, the grid edges across all faces of the cell are connected to form closed segment chains. In a third operation, each segment chain is triangulated separately using "ear clipping," an exemplary embodiment of which is described by G. Meisters in "Polygons have Ears," Amer. Math. Monthly 82 (1975), 648-651, which is herein incorporated by reference.

Figure 5D:
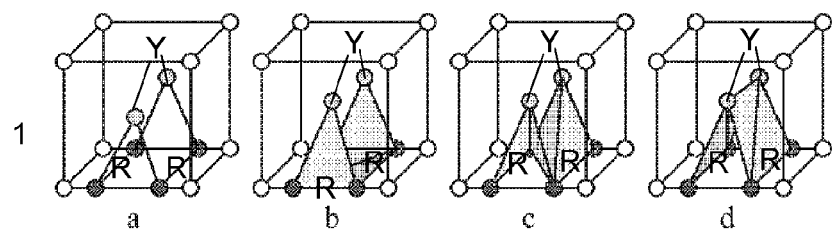

FIG. 5D illustrates a 3-dimensional cell 1-*a* and three possible segment chain triangulations 1-*b*, 1-*c* and 1-*d*. Triangulation 1-*b* is undesired as it includes triangulations on the cell face. Avoiding this result in the third operation can be achieved by avoiding cuts to an ear which lies completely inside one face or which results in triangles formed in only one face of the cell. This can be achieved, for example, by using a bit mask per node that stores one bit for each cell face the node belongs to (yellow node have one, non-yellow nodes have two bits set). If the bit-wise AND of the node masks of an ear is non zero, the cut is illegal.

Triangle result 1-c represents another undesired configuration. This result can be avoided, such that when selecting the next ear, the ear which provides a maximal number of nodes below the ear's plane is chosen, thereby maximizing the enclosed volume.

Figure 5E:
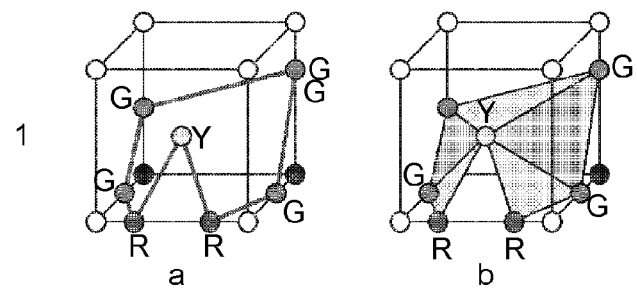

FIG. 5E illustrates a 3-dimensional cell having triangles generated according to the aforementioned 3-step process. In particular, 1-a illustrates the first operation in which a 2-dimensional marching cube template is applied to 6 faces of the grid cell, and 1-b shows the cell after completion of the third operation in which the closed loops of segments are triangulated.

Figure 6:
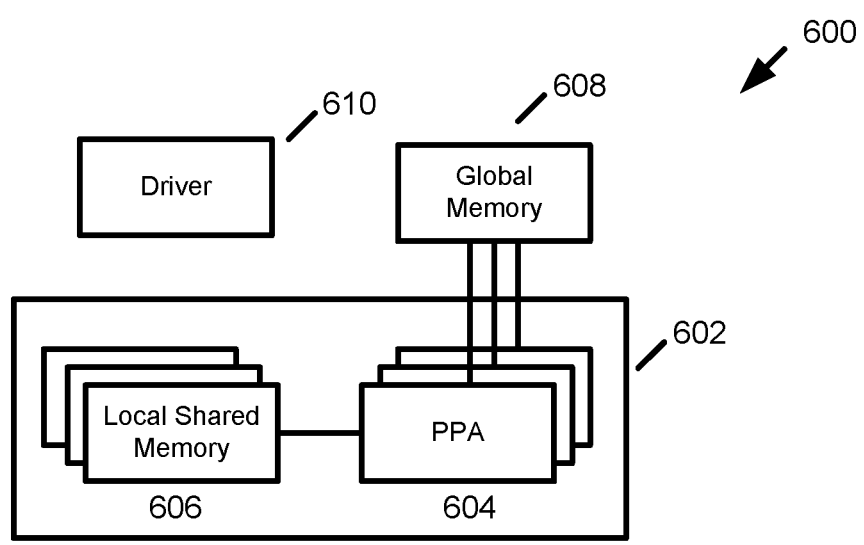
FIG. 6 illustrates an exemplary system operable to carry out the methods of FIGS. 1 and 3 in accordance with the present invention.

FIG. 6 illustrates an exemplary system 600 operable to perform one or more of the operations illustrated in FIGS. 1 and 3 in accordance with the present invention. System 600 includes a processor 602, which includes a plurality of parallel processing architectures 604, each configured to operate on a predetermined number of threads. Accordingly, each parallel processing architecture 604 may operate in parallel, while the corresponding threads may also operate in parallel. In a particular embodiment, the parallel processing architecture 604 is a single instruction multiple data (SIMD) architecture of a predefined SIMD width, for example 32, 64, 128, 256 or more threads.

The processor 602 may further include local shared memory 606, which may be physically or logically allocated to a corresponding parallel processing architecture 604. The system 600 may additionally include a global memory 608 which is accessible to each of the parallel processing architectures 604. The system 600 may further include one or more drivers 610 for controlling the operation of the processor 602 in accordance with the methods of FIGS. 1 and 3. The driver(s) 610 may include one or more libraries for facilitating control of the processor 602. In one embodiment, the system 700 is included within in a graphics card. In another embodiment, the system 600 is included within the motherboard of an imaging system, e.g., a computer. The system 600 may be implemented in other components or systems, for example, a game console, or in an embedded system, such as in a cellular telephone or internet device.

The processor circuitry of the processor 602 is operable to perform (e.g., execute instructions to carry out) any of the operations illustrated in FIGS. 1 and 3 herein. In an embodiment exemplified by FIG. 1, circuitry of processor 602 (herein "processor circuitry") is operable to provide an initial mesh representing a surface, the initial mesh includes a plurality of mesh faces connected between vertices. The processor circuitry is further operable to construct a grid overlapping the initial mesh, the grid including a plurality of grid edges, each grid edge connected between two grid nodes, each grid node having a predefined value associated therewith. The processor circuitry is operable to compute a new value for a node that is connected to the intersected grid edge based upon that grid edge's intersection by the mesh face. The processor circuitry is further operable to modify the initial mesh based upon the new value of the grid node to produce a modified mesh, whereby the modified mesh provides an updated representation of the surface.

In an embodiment exemplified by operations 302-306 of FIG. 3, the processor circuitry is operable to determine an externally-facing side of the intersecting mesh face, determine a reference value associated with the grid node, and compute an offset from the reference value as the new value for the grid node. Further exemplary, said processor circuitry is additionally operable to identify the grid node as either an internal or external grid node based upon the computed new value, and modify the initial mesh to include the grid node if it is determined to be an interior grid node, or to exclude the grid node if it is determined to be an exterior grid node.

The present invention discloses a new system and method for tracking a surface. The method uses an explicit representation of the surface (exemplary, a triangle mesh, although any primitive could be alternatively employed). As such, there is no need for storing and maintaining a scalar field in the neighborhood of the interface. Another advantage of the invention is that it facilitates the preservation of sub-grid features, whereby details such as shallow puddles or thin sheets do not get lost between grid cells. Further advantageously, self-intersected portions of the surface can be identified and differentiated, and thus can be rendered differently to provide more interesting visual effects. The methods are applicable to the tracking of fluid surfaces, as well as other surface types and find application in a variety of fields such as surface rendering of soft tissue deformation in medical simulation, computed tomography, molecular dynamics, and feature profile evolution in nanotechnology.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indices (if any) included in the claims serve to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

What is claimed is:

1. A method for surface tracking, comprising:
   (i) providing an initial mesh representing a surface, the initial mesh comprising a plurality of mesh faces;
   (ii) constructing a grid utilizing a processor, the grid having a plurality grid edges, wherein each grid edge is connected between two grid nodes, wherein each grid node has a predefined value associated therewith, and wherein a grid edge is intersected by an even number of oppositely oriented mesh faces of the initial mesh;

(iii) computing a value for a first grid node connected to said intersected grid edge based upon the intersection of said grid edge by said even number of oppositely oriented mesh faces, wherein the value for the first grid node is the same as a value of a second grid node connected to the grid edge intersected by the even number of oppositely oriented mesh faces; and (iv) modifying the initial mesh based upon the grid edge being intersected by the even number of mesh faces between the first grid node and the second grid node having the same values to produce a modified mesh by creating at least two vertices along the grid edge, wherein the modified mesh provides an updated representation of the surface.

2. The method of claim 1, wherein (i) comprises providing an explicit triangle mesh for the surface.

3. The method of claim 1, wherein (ii) comprises constructing an Eulerian grid.

4. The method of claim 1, wherein the surface comprises a fluid surface.

5. The method of claim 1, wherein (iv) comprises:
based upon the value of the first grid node, identifying the first grid node as located either inside the surface, or outside the surface; and
modifying the initial mesh to include the first grid node if it is identified as located inside the surface, or to exclude the first grid node if it is identified as located outside the surface.

6. The method of claim 1,
wherein a mesh face of the oppositely oriented mesh faces includes an external side that faces outward away from the surface, and an internal side that faces inwardly into the surface; and
wherein the value computed in (iii) is based upon whether the external side of the mesh face is adjacent to the first grid node, or whether the internal side of the mesh face is adjacent to the first grid node.

7. The method of claim 6, wherein (iii) comprises;
if the internal side of the intersecting mesh face is adjacent the first grid node, computing a first value associated with the first grid node, or
if the external side of the intersecting mesh face is adjacent the first grid node, computing a second value associated with the first grid node.

8. The method of claim 7, wherein computing the first value comprises:
determining a reference value associated with the first grid node; and
adding a predefined count to the reference value associated with the first grid node to compute the first value.

9. The method of claim 7, wherein computing the second value comprises:
determining a reference value associated with the first grid node; and
subtracting a predefined count from the reference value associated with the first grid node to compute the second value.

10. The method of claim 8, wherein the reference value associated with the first grid node is computed as a function of at least two values associated with at least two grid nodes of the grid.

11. The method of claim 10, wherein the reference value associated with the first grid node is a weighted average of the at least two values associated with the at least two grid nodes of the grid.

12. The method of claim 1, wherein the at least two vertices created along the grid edge are created at positions chosen as minimum and maximum locations of all registered intersections on the grid edge.

13. A system operable to track a surface representation, the system having a processor comprising:

(i) processor circuitry operable to provide an initial mesh representing a surface, the initial mesh comprising a plurality of mesh faces;

(ii) processor circuitry operable to construct a grid, the grid having a plurality grid edges, wherein each grid edge is connected between two grid nodes, wherein each grid node has a predefined value associated therewith, and wherein a grid edge is intersected by an even number of oppositely oriented mesh face of the initial mesh;

(iii) processor circuitry operable to compute a value for a first grid node connected to said intersected grid edge based upon the intersection of said grid edge by said even number of oppositely oriented mesh faces, wherein the value for the first grid node is the same as a value of a second grid node connected to the grid edge intersected by the even number of oppositely oriented mesh faces; and (iv) processor circuitry operable to modify the initial mesh based upon the grid edge being intersected by the even number of mesh faces between the first grid node and the second grid node having the same values to produce a modified mesh by creating at least two vertices along the grid edge, wherein the modified mesh provides an updated representation of the surface.

14. The system of claim 13, wherein (i) comprises processor circuitry operable to provide an explicit triangle mesh for the surface.

15. The system of claim 13, wherein the surface comprises a fluid surface.

16. The system of claim 13, wherein (iv) comprises:
processor circuitry operable to identify the first grid node as located either inside the surface, or outside the surface based upon the value of the first grid node; and
processor circuitry operable to modify the initial mesh to include the first grid node if it is identified as located inside the surface, or to exclude the first grid node if it is identified as located outside the surface.

17. The system of claim 13,
wherein a mesh face of the oppositely oriented mesh faces includes an external side that faces outward away from the surface, and an internal side that faces inwardly into the surface; and
wherein the value computed in (iii) is based upon whether the external side of the mesh face is adjacent to the first grid node, or whether the internal side of the mesh face is adjacent to the first grid node.

18. The system of claim 13, wherein (iii) comprises:
processor circuitry operable to compute a first value associated with the first grid node if the internal side of the intersecting mesh face is adjacent to the first grid node, and
processor circuitry operable to compute a second value associated with the first grid node if the external side of the intersecting mesh face is adjacent to the first grid node.

19. The system of claim 18, wherein the processor circuitry operable to compute the first value comprises:

processor circuitry operable to determine a reference value associated with the first grid node; and processor circuitry operable to add a predefined count to the reference value associated with the first grid node to compute the first value.

20. The system of claim 18, wherein the processor circuitry operable to compute the second value comprises:

processor circuitry operable to determine a reference value associated with the first grid node; and processor circuitry operable to subtract a predefined count from the reference value associated with the first grid node to compute the second value.

21. A computer program product, resident on a non-transitory computer readable medium, and operable to execute instructions for tracking the representation of a surface, the computer program product comprising:

(i) instruction code to provide an initial mesh representing a surface, the initial mesh comprising a plurality of mesh faces;

(ii) instruction code to construct a grid, the grid having a plurality grid edges, wherein each grid edge is connected between two grid nodes, wherein each grid node has a predefined value associated therewith, and wherein a grid edge is intersected by an even number of oppositely oriented mesh faces of the initial mesh;

(iii) instruction code to compute a value for a first grid node connected to said intersected grid edge based upon the intersection of said grid edge by said even number of oppositely oriented mesh faces, wherein the value for the first grid node is the same as a value of a second grid node connected to the grid edge intersected by the even number of oppositely oriented mesh faces; and (iv) instruction code to modify the initial mesh based upon the grid edge being intersected by the even number of mesh faces between the first grid node and the second grid node having the same values to produce a modified mesh by creating at least two vertices along the grid edge, wherein the modified provides an updated representation of the surface.

22. The computer program product of claim 21 wherein (iv) comprises:

instruction code to identify the first grid node as located either inside the surface, or outside the surface based upon the value of the first grid node; and instruction code to modify the initial mesh to include the first grid node if it is identified as located inside the surface, or to exclude the first grid node if it is identified as located outside the surface.

23. The computer program product of claim 21, wherein a mesh face of the oppositely oriented mesh faces includes an external side that faces outwardly away from the surface, and an internal side that faces inwardly into the surface, wherein the computed value is based upon whether the external side of the mesh face is adjacent to the first grid node, or whether the internal side of the mesh face is adjacent the first grid node, and wherein (iii) comprises:

instruction code to compute a first value associated with the first grid node if the internal side of the intersecting mesh face is adjacent to the first grid node, and instruction code to compute a second value associated with the first grid node if the external side of the intersecting mesh face is adjacent to the first grid node.

* * * * *